United States Patent
Singh et al.

(10) Patent No.: US 10,142,878 B1
(45) Date of Patent: Nov. 27, 2018

(54) SYSTEMS AND METHODS FOR HANDOVER OF A HIGH POWER WIRELESS DEVICE OPERATING IN A WIRELESS NETWORK

(71) Applicant: Sprint Spectrum LP, Overland Park, KS (US)

(72) Inventors: Jasinder P. Singh, Olathe, KS (US); Siddharth S. Oroskar, Overland Park, KS (US)

(73) Assignee: Sprint Spectrum L.P., Overland Park, KS (US)

(*) Notice: Subject to any disclaimer, the term of this patent is extended or adjusted under 35 U.S.C. 154(b) by 0 days.

(21) Appl. No.: 15/477,157

(22) Filed: Apr. 3, 2017

(51) Int. Cl.
*H04W 40/10* (2009.01)
*H04W 40/08* (2009.01)
*H04W 28/02* (2009.01)
*H04W 36/00* (2009.01)

(52) U.S. Cl.
CPC ... *H04W 28/0221* (2013.01); *H04W 28/0226* (2013.01); *H04W 28/0273* (2013.01); *H04W 36/0072* (2013.01); *H04W 40/08* (2013.01); *H04W 40/10* (2013.01)

(58) Field of Classification Search
CPC . H04W 28/0221; H04W 40/10; H04W 28/02; H04W 40/08; H04W 36/00
See application file for complete search history.

(56) References Cited

U.S. PATENT DOCUMENTS

| 9,078,220 | B2 | 7/2015 | Makhlouf et al. | |
|---|---|---|---|---|
| 2004/0214575 | A1* | 10/2004 | Jovanovic | H04W 36/04 455/444 |
| 2011/0310781 | A1* | 12/2011 | Kim | H04L 5/0007 370/311 |
| 2016/0323922 | A1* | 11/2016 | Park | H04W 24/10 |
| 2018/0027437 | A1* | 1/2018 | Vitthaladevuni | H04L 1/0026 370/252 |

* cited by examiner

*Primary Examiner* — Frantz Bataille

(57) ABSTRACT

Systems and methods are described for extending coverage of a wireless device. A plurality of wireless devices located in a coverage area of a first access node can be monitored for a first condition. At least one wireless device of the plurality of wireless devices that meets the first condition can be classified as a high power wireless device. Two or more indicators reported by the at least one wireless device are compared to a criteria. When the two or more indicators meet the criteria, a handoff of the at least one wireless device from the first access node to a second access node can be performed.

7 Claims, 7 Drawing Sheets

SYSTEMS AND METHODS FOR HANDOVER OF A HIGH POWER WIRELESS DEVICE OPERATING IN A WIRELESS NETWORK

TECHNICAL BACKGROUND

As wireless networks evolve and grow, there are ongoing challenges with reaching targeted coverage levels. In an effort to boost coverage and enhance throughput, wireless network operators are co-deploying high power class wireless devices alongside low power class wireless devices (e.g., off-the-shelf and/or other legacy wireless devices) within coverage areas served by access nodes of wireless networks. But, when high power class wireless devices are deployed in areas of the wireless network having an access node density designed for low power class wireless devices, there are certain uplink (UL) interference concerns. Namely, UL link budget(s) for low power class wireless devices operating within the same coverage area as high power class wireless devices are often degraded due, in part, to power mismatches between the high power class wireless devices and low power class wireless devices. In addition, artificial limits assigned to allowable transmit power(s) of the co-deployed wireless devices (e.g., based on power class rather than a capability of the wireless device hardware) causes access nodes of the wireless network to handoff high power class wireless devices before necessary from a range extension perspective. Consequently, the capabilities of high power class wireless devices are not fully exploited by the wireless networks and coverage (or extension) gains are unnecessarily limited.

OVERVIEW

Systems and methods are described for handoff of a wireless device. In one embodiment, power reports are received at a first access node from multiple wireless devices operating within a coverage area of the first access node. Based on the received power reports, the access node groups the multiple wireless devices into first and second groups of wireless devices; the first access node assigns first and second signal thresholds to the first group of wireless devices. The wireless devices of the first group of wireless devices may be instructed to report first and second signal indicators associated with a second access node. The first access node may compare the reported first and second signal indicators of the wireless devices of the first group of wireless devices to the assigned first and second signal thresholds, respectively. For each wireless device of the first group of wireless devices whose reported first and second signal indicators meet the first and second signal thresholds, respectively, the first access node may trigger a handoff to the second access node.

In another embodiment, a plurality of wireless devices operating in a coverage area of a first access node may be instructed to report a power headroom at the first access node. Each wireless device of the plurality of wireless devices may be classified at the first access node as either a high power class wireless device or a low power class wireless device based on the reported power headroom. Signal indicators reported by the wireless devices classified as high power class wireless devices may be monitored at the first access node. The first access node may perform handoff of at least one high power class wireless device when the monitored signal indicators of the at least one high power class wireless device meet a handoff threshold.

In yet another embodiment, an access node may instruct connected high power class wireless devices to measure signal quality indicators. The access node may compare the measured signal quality indicators to signal quality thresholds. The access node may extend coverage for the high power class wireless devices until the measured signal quality indicators exceed the signal quality thresholds.

In another embodiment, handover thresholds for connected wireless devices may be established at a first access node based on a power class of the wireless device. The first access node may monitor signal indicators reported by high power class wireless devices at the first access node and compare the monitored signal indicators to handover thresholds established for the high power class wireless devices. When two or more of the monitored signal indicators exceed the established handover thresholds, the first access node may instruct the high power class wireless device to connect to a second access node.

In yet another embodiment, a first access node may receive power headroom reports from a plurality of wireless devices connected to the first access node. The first access node may select at least one candidate wireless device for handover to a second access node and monitor signal indicators reported by the candidate wireless device. When two or more of the monitored signal indicators meet a threshold, the first access node may trigger handoff of the candidate wireless device from the first access node to a second access node.

In another embodiment, a plurality of wireless devices located in a coverage area of a first access node may be monitored for a first condition. The first access node may classify at least one of the monitored wireless devices as a high power class wireless device based on the first condition. Two or more indicators of the at least one wireless device may be compared to a criteria. When the two or more indicators meet the criteria, the first access node may perform a handover of the at least one wireless device from the first access node to a second access node.

DETAILED DESCRIPTION

As wireless networks evolve and grow, there are ongoing challenges associated with reaching targeted coverage levels. In an effort to boost coverage and enhance throughput of wireless networks, wireless network operators have proposed co-deployment of high power wireless devices (e.g., power class 1 or 2 wireless devices, illustrated in Table 1 below) alongside low power wireless devices (e.g., off-the-shelf and/or other legacy wireless devices classified as power class 3 or 4 wireless devices, illustrated in Table 1 below) throughout the wireless network. But, when high power wireless devices are co-deployed in areas of the wireless network with an access node density designed for low power wireless devices, the uplink (UL) link budget for low power wireless devices operating within the same area may be degraded due, in part, to overlooked power differences between the high power and low power wireless devices. Further, when the co-deployed high power and low power wireless devices operate at cell-edges (or band-edges) of access nodes of the wireless network (e.g., at a maximum allowable transmit power), the wireless devices can cause severe inter-cell interference with neighboring access nodes. In addition, artificial limits (or constraints) assigned to an allowable transmit power of the co-deployed high power and low power wireless devices (e.g., based on power class rather than a hardware capability of the wireless device) causes high power and/or low power wireless devices to reach the allowable transmit power before necessary from a range extension perspective.

In one embodiment, as high power and/or low power wireless devices move throughout the wireless network, access nodes of the wireless network can configure reporting procedures at each of the co-deployed wireless devices. The reporting procedures can be used by access nodes of the wireless network to collect signal indicators from the co-deployed high power and low power wireless devices; the signal indicators may be used to inhibit (or delay) handoff of the wireless devices. For example, access nodes of the wireless network can inhibit (or delay) handoff of the co-deployed high power and/or low power wireless devices when the signal indicators, collected from the wireless devices via the reporting procedures, do not meet various signal metrics (or threshold) preset at, for example, the access nodes. The signal metrics may be preset based on the power class(es) of the co-deployed high power and low power wireless devices.

Figure 1A:
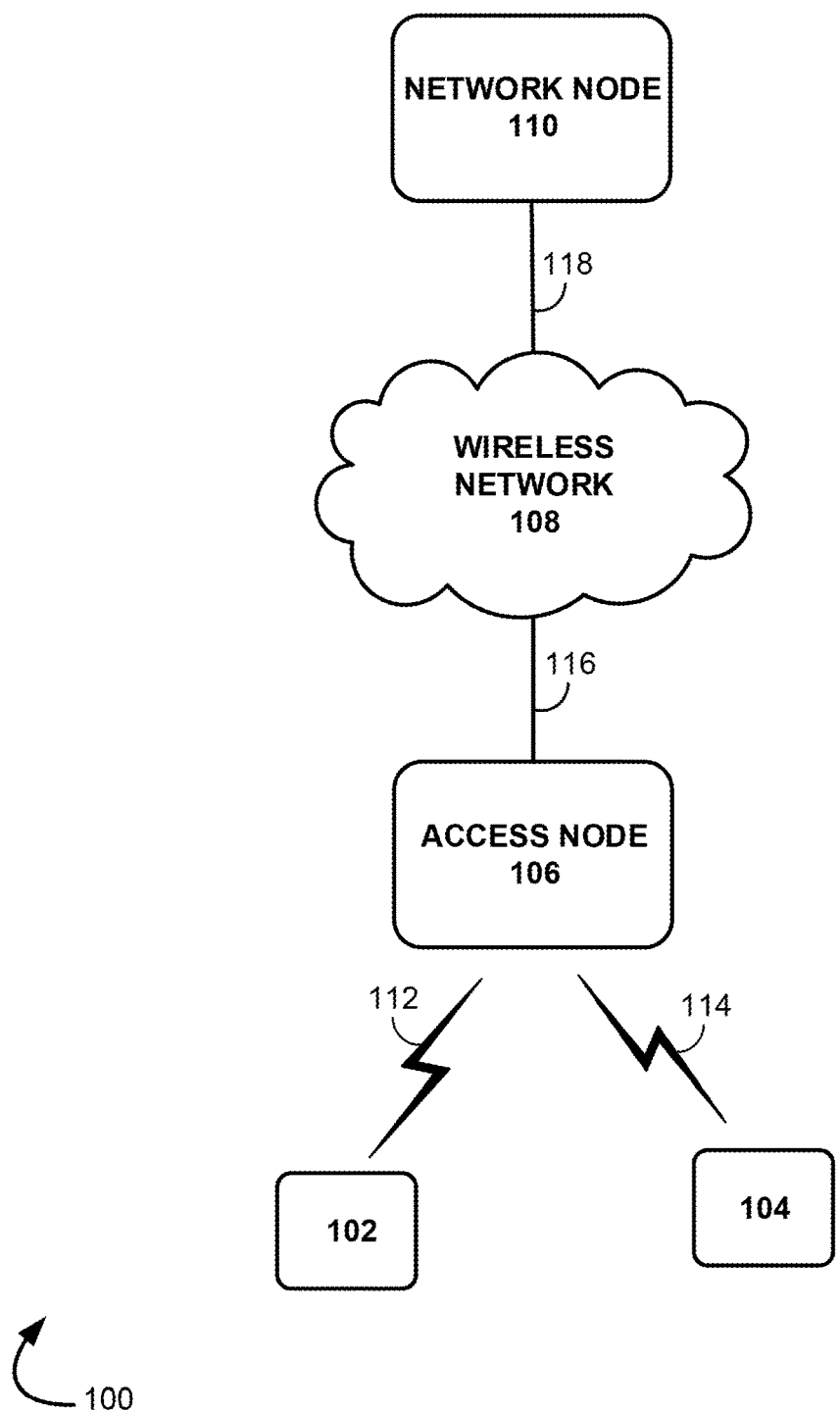
FIG. 1A illustrates an exemplary communication system for handoff of a wireless device operating in a wireless network.
Figure 1B:
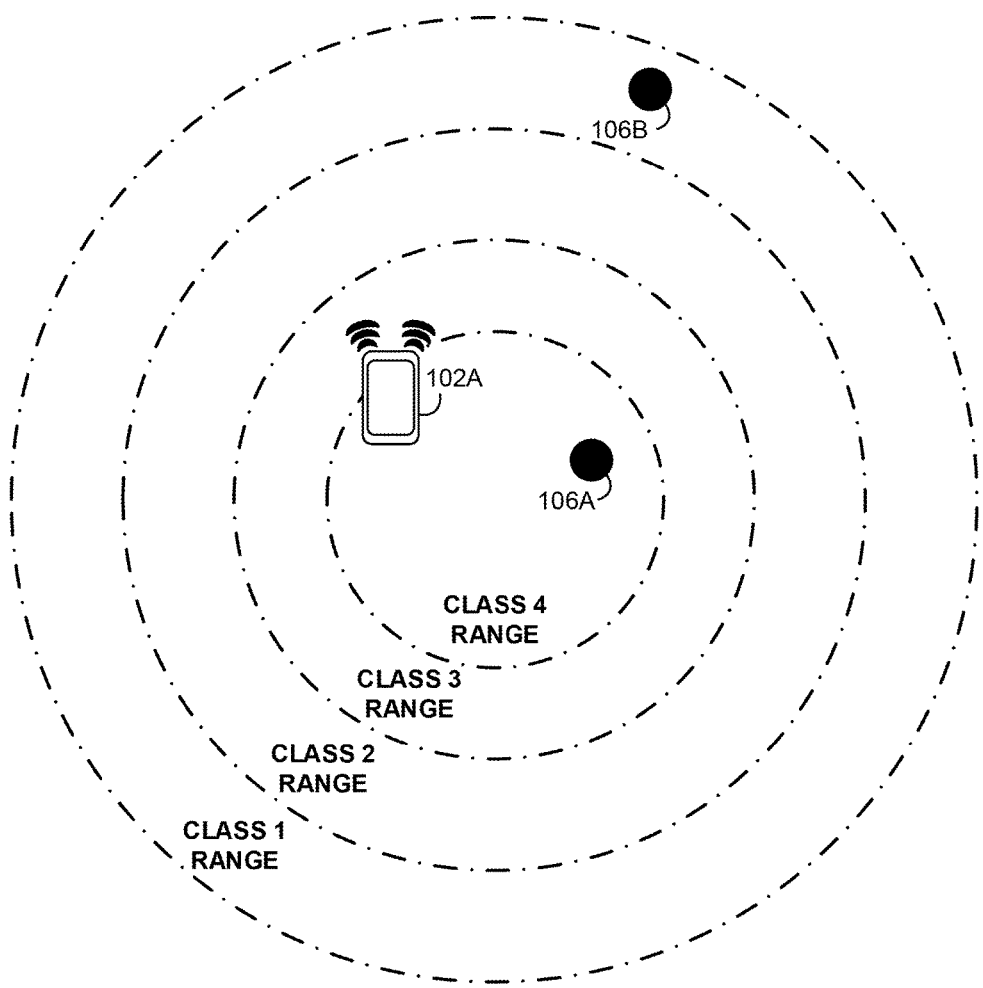
FIG. 1B illustrates exemplary power class range(s) of high power class wireless devices and low power class wireless devices of the exemplary communication system illustrated in FIG. 1A.

FIG. 1A illustrates an exemplary communication system 100 for handoff of wireless devices operating in a wireless communication network. FIG. 1B illustrates exemplary power class range(s) of high power and low power wireless devices of the exemplary communication system 100 illustrated in FIG. 1A. System 100 can comprise high power and/or low power wireless devices 102, 102A, 104, access nodes 106, 106A, 106B, network node 110, and wireless network 108. Access nodes 106, 106A, 106B can further include a data scheduler (not shown). The communications between high power and/or low power wireless devices 102, 102A, 104 can be relayed, monitored, inspected, and/or scheduled by an inspection module or node (not shown) at access nodes 106, 106A, 106B.

Other network elements may be present in the communication system 100 to facilitate communication but are omitted for clarity, such as controller nodes, base stations, base station controllers, gateways, mobile switching centers (MSC), dispatch application processors (DAP), and location registers such as a home location register (HLR) or visitor location register (VLR). Furthermore, other network elements may be present to facilitate communication between high power and low power wireless devices 102, 102A, 104, access nodes 106, 106A, 106B, wireless network 108, and network node 110, which are omitted for clarity, including additional processing nodes, routers, gateways, and physical and/or wireless data links for carrying data among the various network elements.

As noted above, wireless devices 102, 102A, 104 can be configured as different power class wireless devices (e.g., co-deployed high power and/or low power wireless devices) and can be any device configured to communicate over system 100 using a wireless communication link or interface. In one embodiment, illustrated in Table 1 below, the maximum allowable transmit power for wireless devices 102, 102A, 104 can be defined by the power class of the wireless device. For example, the maximum allowable transmit power level and tolerance (i.e., power error limits associated with a particular power class) with which wireless devices 102, 102A, 104 can transmit data on a given operating band (e.g., Bands I-III) are specified based on a pre-defined power class (e.g., power classes 1-4, illustrated in Table 1 below and FIG. 1B) of the wireless device 102, 102A, 104 rather than a physical maximum transmit capability of the wireless device 102, 102A, 104 hardware (i.e., the maximum allowable transmit power for wireless devices 102, 102A, 104 can be artificially limited).

In one embodiment, high power and/or low power wireless devices can be implemented using Third Generation Partnership Project Long Term Evolution (3GPP LTE) network architecture and/or protocol. For example, low power wireless devices (e.g., off-the-shelf and/or other legacy wireless devices) are currently defined in LTE as power class 3 and/or power class 4 wireless devices. Power class 3 and/or power class 4 wireless devices can be configured (in LTE) with a maximum allowable transmit power level of +23 dBm for network operating Bands I-III with a nominal power tolerance of ±2 dB (e.g., for E-UTRA bands), as illustrated in Table 1. High power wireless devices are currently defined in LTE as power class 1 and/or power class 2 wireless devices. Power class 1 and/or power class 2 wireless devices can be configured (in LTE) with a maximum allowable transmit power of +26 dBm for network operating Bands I-II with a nominal power tolerance ±2 dB (e.g., for E-UTRA bands), as illustrated in Table 1. But, one of ordinary skill in the art would recognize that high power and/or low power wireless devices are not limited to any specific technology architecture, such as LTE, and can be used with any network architecture and/or protocol.

TABLE 1

| Operating Band | Power Class 1 Wireless Device | | Power Class 2 Wireless Device | | Power Class 3 Wireless Device | | Power Class 4 Wireless Device | |
|---|---|---|---|---|---|---|---|---|
| | Power (dBm) | Tol. (dB) | Power (dBm) | Tol. (dB) | Power (dBm) | Tol. (dB) | Power (dBm) | Tol. (dB) |
| Band I | 31 | ±2 | 26 | ±2 | 23 | ±2 | 21 | ±2 |
| Band II | — | — | 26 | ±2 | 23 | ±2 | 21 | ±2 |
| Band III | — | — | — | — | 23 | ±2 | 21 | ±2 |

Co-deployed wireless devices 102, 102A, 104 can include a cell phone, a smart phone, a computing platform such as a laptop, a palmtop, or a tablet, a personal digital assistant (PDA), an internet access device, and combinations thereof. Wireless devices 102, 102A, 104 can transmit and/or receive information over system 100 using various communication services. These services can include various voice, data, and/or MBMS services and applications. For example, mobile voice services, mobile data services, push-to-talk services, internet services, web browsing, email, pictures, picture messaging, video, video messaging, broadcast video, audio, voicemail, music MP3's, ring tones, stock tickers, news alerts, etc.

Access nodes 106, 106A, 106B can be any network node configured to provide communication between wireless devices 102, 102A, 104 and wireless network 108. Access nodes 106, 106A, 106B can be short range access nodes or standard access nodes. A short range access node could include a microcell base station, a picocell base station, a femtocell base station, relay node, or the like. A standard access node could include base transceiver stations, radio base stations, radio network controllers, an eNodeB device, or an enhanced eNodeB device, a donor eNodeB, or the like. Access nodes 106, 106A, 106B can use data scheduler(s) and/or coordinate with a scheduler node (not shown) to communicate scheduling decisions (e.g., UL/DL scheduling assignments) to wireless devices 102, 102A, 104 using control information carried by an UL/DL control channel. Access nodes 106, 106A, 106B can collect and store maximum allowable transmit power (e.g., associated with a defined power class of wireless device 102, 102A, 104) and/or data related to capacity/delay characteristics (e.g., an amount of data buffered per wireless device, a radio frequency (RF) signal quality of the wireless device, buffer delay or period of time from receipt of a last data packet at the wireless device, access node sector throughput, cell-edge wireless device user experience, guaranteed bit rate/non-guaranteed bit rate, backhaul limitations/capacity, wireless device mobility, etc.) of wireless devices 102, 102A, 104 reported (or collected) at access node 106, 106A, 106B.

Access nodes 106, 106A, 106B can comprise a processor and associated circuitry to execute or direct the execution of computer-readable instructions to obtain information. Access nodes 106, 106A, 106B can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Access nodes 106, 106A, 106B can receive instructions and other input at a user interface.

Wireless network 108 can be a wired and/or wireless communication network, and can comprise processing nodes, routers, gateways, and physical and/or wireless data links for carrying data among various network elements, including combinations thereof, and can include a local area network (LAN), a wide area network (WAN), and an internetwork (including the Internet). Wireless network 108 can be capable of carrying data, for example, to support voice, push-to-talk, broadcast video, and data communications by a wireless device, for example, wireless devices 102, 102A, 104. Wireless network protocols can comprise Code Division Multiple Access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX). Wired network protocols that may be utilized by wireless network 108 comprise Ethernet, Fast Ethernet, Gigabit Ethernet, Local Talk (such as Carrier Sense multiple Access with Collision Avoidance), Token Ring, Fiber Distributed Data Interface (FDDI), and Asynchronous Transfer Mode (ATM). Wireless network 108 can also comprise additional base stations, controller nodes, telephony switches, internet routers, network gateways, computer systems, communication links, or some other type of communication equipment, and combinations thereof.

Network node 110 can be any network node configured to communicate information and/or control information over system 100. For example, network node 110 can receive and/or transmit information to/from wireless devices 102, 102A, 104 over system 100. While network node 110 is shown in the backhaul of system 100, network node 110 could alternatively be located between access nodes 106, 106A, 106B and wireless network 108. Network node 110 can be a standalone computing device, computing system, or network component, and can be accessible, for example, by a wired or wireless connection, or through an indirect connection such as through a computer network or wireless network. For example, network node 110 can include a Mobility Management Entity (MME), a Home Subscriber Server (HSS), a Policy Control and Charging Rules Function (PCRF), an Authentication, Authorization, and Accounting (AAA) node, a Rights Management Server (RMS), a Subscriber Provisioning Server (SPS), a policy server, etc. One of ordinary skill in the art would recognize that network node 110 is not limited to any specific technology architecture, such as LTE, and can be used with any network architecture and/or protocol.

Communication links 112, 114, 116, 118 can be wired or wireless and use various communication protocols such as Internet, Internet Protocol (IP), LAN optical networking, Hybrid Fiber Coax (HFC), telephony, T1, or some other communication format—including combinations, improvements, or variations thereof. Wireless communication links 112, 114, 116, 118 can be a radio frequency, microwave, infrared, or other similar signal, and can use a suitable communication protocol, for example, GSM, CDMA, WiMAX, LTE, or combinations thereof. Other wireless protocols can also be used. Links 112, 114, 116, 118 can be a direct link or might include various equipment, intermediate components, systems, and networks.

Figure 2:
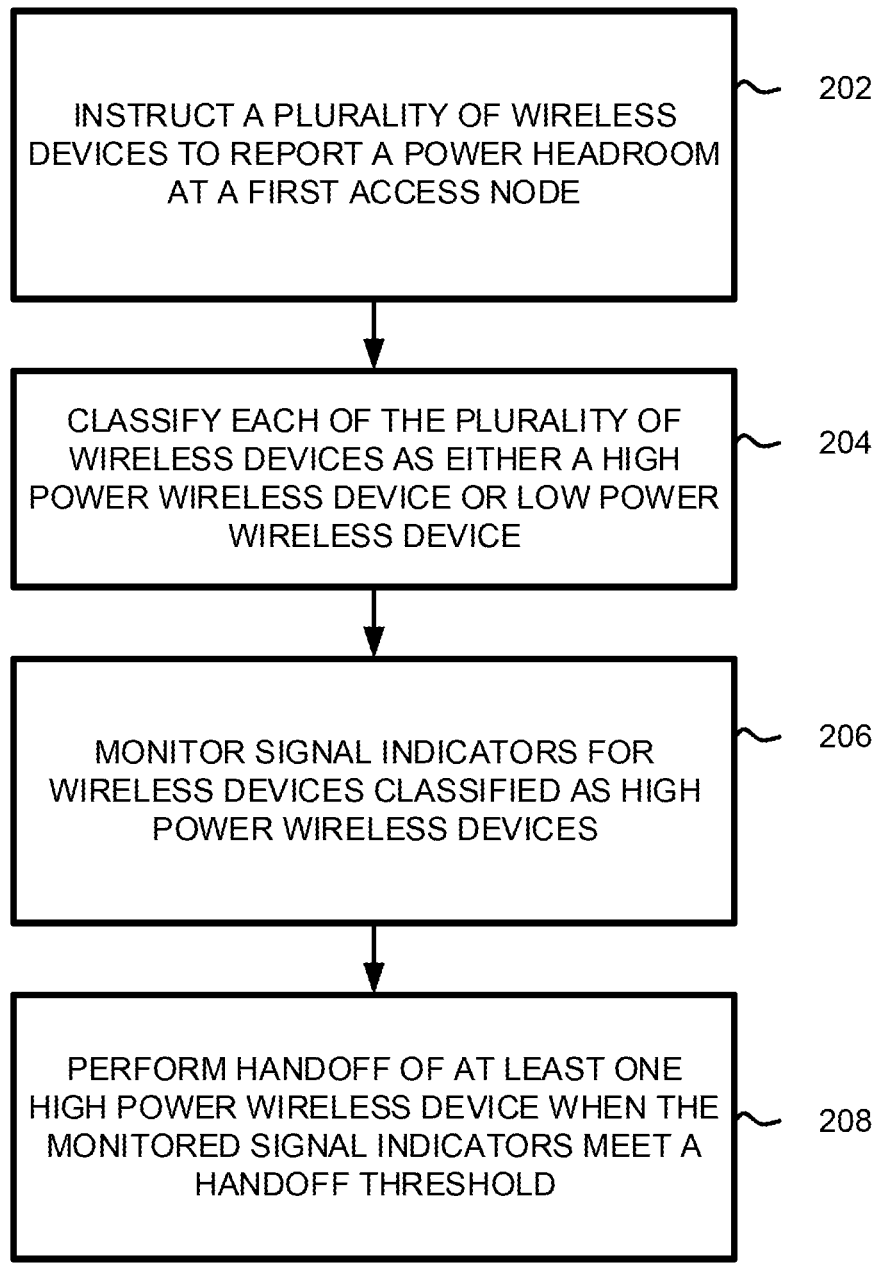
FIG. 2 illustrates an exemplary method for handoff of wireless devices operating in a wireless network.

FIG. 2 illustrates an exemplary method for handoff of wireless devices operating in a wireless communication network. The method of FIG. 2 will be discussed with reference to the exemplary system 100 illustrated in FIG. 1A and the exemplary power class range(s) of co-deployed high power and low power wireless devices of the exemplary communication system 100 illustrated in FIG. 1B. But, the exemplary method for handoff of wireless devices illustrated in FIG. 2 can be implemented with any suitable communication system. In addition, although FIG. 2 depicts steps performed in a particular order or arrangement. One skilled in the art, using the disclosure provided herein, will appreciate that various steps of the method can be omitted, rearranged, combined, and/or adapted in various ways.

Referring to FIG. 2, at 202, the wireless network and/or access nodes can instruct co-deployed wireless devices to report a power headroom at an access node. For example, wireless devices 102, 102A, 104 can use periodic and/or event-triggered PHR and/or ePHR messaging to report a current transmit power state or power headroom at access node 106, 106A, 106B. The current transmit power state or power headroom can be calculated as follows:

$$PH_i = P_{cMAX} - \{10 \log_{10}(M_{PUSCH}(i)) + P_{o\_PUSCH}(j) + \alpha(j) \cdot PL + \Delta_{TF}(i) + f(i)\}[\text{dBm}],$$

where $P_{cmax}$ is the maximum allowable transmit power of wireless device 102, 102A, 104, $M_{PUSCH}(i)$ is the number of wireless resources (e.g., the next available physical resource block, wireless spectrum, etc.) allocated to wireless device 102, 102A, 104, $P_{o\_PUSCH}(j)$ is a target received power, $\alpha(j)$ is a pathloss compensation factor, and PL is a calculated pathloss between wireless device 102, 102A, 104 and access node 106, 106A, 106B. $\Delta_{TF}(i)$ and f(i) are parameters used to calculate an offset associated with a transport format and a power control adjustment, respectively.

At 204, the wireless network and/or access nodes can classify each of the co-deployed wireless devices as high power and/or low power wireless devices. For example, based on the current transmit power state or power headroom reported at access node 106, 106A, 106B (e.g., using PHR and/or ePHR messaging discussed at 202), access node 106, 106A, 106B can classify (or group) the wireless devices 102, 102A, 104 as high power wireless devices or low power wireless devices. Namely, those co-deployed wireless devices 102, 102A reporting a greater current transmit power state or power headroom than other wireless devices 104 operating within the coverage area of the access node 106, 106A, 106B may be classified (or grouped) as a high power wireless device 102, 102A. In one embodiment, wireless devices 102, 102A may report a current UL transmit power of +26 dBm (e.g., power class 1 or 2 wireless devices, illustrated in Table 1) and wireless device 104 may report a current UL transmit power of +21 dBm (e.g., power class 3 or 4 wireless devices, illustrated in Table 1). Based on the reported UL transmit power, wireless devices 102, 102A may be classified (or grouped) as high power wireless devices and wireless device 104 may be classified (or grouped) as a low power wireless device.

At 206, the wireless network and/or access node can monitor signal indicators reported by high power wireless devices. For example, wireless network 108 and/or access node 106, 106A, 106B can configure reporting procedures (e.g., other than or in addition to the PHR and/or ePHR reporting discussed in steps 202 and 204) to collect signal indicators from the co-deployed wireless devices 102, 102A, 104 classified (or grouped) as high power wireless devices 102, 102A; the signal indicators may be used to inhibit (or delay) handoff of the high power wireless devices 102, 102A. In one embodiment, access node 106, 106A of wireless network 108 can inhibit (or delay) handoff of the high power wireless devices 102, 102A when the signal indicators, collected from the high power wireless devices 102, 102A via the reporting procedures, do not meet various signal metrics (or thresholds) preset at, for example, access node 106, 106A. The signal metrics may be preset based on the power class of the high power wireless devices 102, 102A.

For example, in an exemplary embodiment, high power wireless devices 102, 102A can measure signal indicators at the wireless device 102, 102A and report the signal indicators at access node 106, 106A. The signal indicators can include indicators of signal strength, for example, Reference Signal Received Power (RSRP), a Received Signal Strength Indication (RSSI), a Signal-to-Noise Ratio (SNR), a Carrier-to-Noise Ratio (CNR) value, a Signal Noise and Distortion (SINAD), a Signal to Interference (SII), a Signal to Noise Plus Interference (SINR), a Signal to Quantization Noise Ratio (SQNR), etc., associated with access node 106, 106A, 106B. In addition, the signal indicators include indicators of signal quality, for example, a Reference Signal Receive Quality (RSRQ), a Channel Quality Indicator (CQI), and/or Quality of Service (QoS) requirements, call type, or other policy-related aspects. The wireless network 108 and/or access node 106, 106A can implement periodic and/or event-triggered monitoring of the signal indicators. When the signal indicators, collected from high power wireless devices 102, 102A via the reporting procedures, meet signal metrics (or thresholds) preset at access node 106, 106A, access node 106, 106A can initiate handoff of the high power wireless device 102, 102A.

At 208, the wireless network and/or access node can perform handoff of high power wireless devices when the monitored signal indicators meet signal metrics (or thresholds) preset at the access node. In one embodiment, high power wireless devices 102, 102A report RSRP and RSRQ signal indicators at access node 106, 106A; the access node 106, 106A may implement period or event-triggered monitoring of the reported RSRP and RSRQ signal indicators. When the monitored RSRP and RSRQ signal indicators meet a signal metric (or threshold) preset at access node 106, 106A, the access node 106, 106A initiates handoff of the high power wireless device 102, 102A. In one embodiment, the signal metric (or threshold) can be RSRP and RSRQ metrics (or thresholds); the RSRP and RSRQ metrics can be preset based on the power class (e.g., illustrated in Table 1) of high power wireless device 102, 102A. When the reported RSRP signal indicator meets the preset RSRP metric (or threshold) and the reported RSRQ signal indicator meets the preset RSRQ metric (or threshold), access node 106, 106A can perform handoff of the high power wireless device 102, 102A from access node 106, 106A to neighboring access node 106B.

Figure 3:
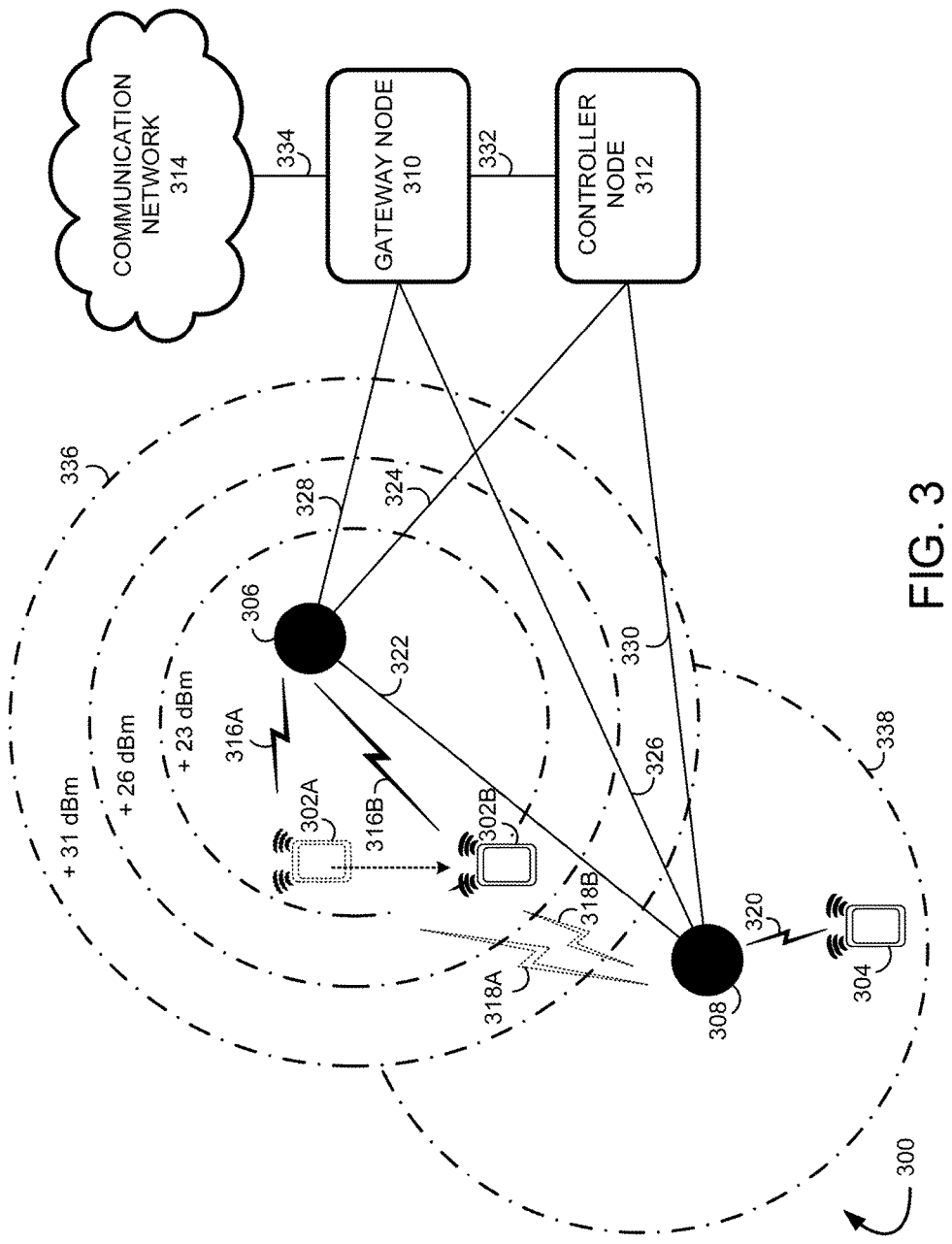
FIG. 3 illustrates another exemplary communication system for handoff of wireless devices operating in a wireless network.

FIG. 3 illustrates another exemplary communication system 300 for handoff of wireless devices operating in a communication network. The system 300 will be discussed with reference to the exemplary power class range(s) of co-deployed high power and low power wireless devices illustrated in FIG. 1B. System 300 can comprise high power and/or low power wireless devices 302, 304, access nodes 306, 308 (which can include data schedulers), gateway node 310, controller node 312, and wireless network 314. A scheduler node (not shown) can be included in the backhaul of system 300. The communications between high power and/or low power wireless devices can be relayed, monitored, inspected, and/or scheduled by an inspection module or node (not shown) at access nodes 306, 308 and/or a data scheduler or scheduler node (not shown).

Other network elements may be present in the communication system 300 to facilitate communication but are omitted for clarity, such as controller nodes, base stations, base station controllers, gateways, MSC, DAP, and location registers such as a HLR or VLR. Furthermore, other network elements may be present to facilitate communication between co-deployed high power and/or low power wireless devices 302, 304, access nodes 306, 308, etc., and wireless network 314.

As noted above, wireless devices 302, 304 can be configured as different power class wireless devices (e.g., high power and/or low power wireless devices) and can be any device configured to communicate over system 300 using a wireless communication link or interface. For example, low power wireless devices (e.g., off-the-shelf and/or other legacy wireless devices) are currently defined in LTE as power class 3 and/or power class 4 wireless devices. Power class 3 and/or power class 4 wireless devices can be configured (in LTE) with a maximum allowable transmit power level of +23 dBm for network operating Bands I-III with a nominal power tolerance of ±2 dBm (e.g., for E-UTRA bands), as illustrated in Table 1. High power wireless devices are currently defined in LTE as power class 1 and/or power class 2 wireless devices. Power class 1 and/or power class 2 wireless devices can be configured (in LTE) with a maximum allowable transmit power level of +26 dBm for network operating Bands I-II with a nominal power tolerance of ±2 dBm (e.g., for E-UTRA bands), as illustrated in Table 1.

Wireless devices 302, 304 (e.g., configured as either high power and/or low power wireless devices) can include a cell phone, a smart phone, a computing platform such as a laptop, a palmtop, or a tablet, a PDA, an internet access device, and combinations thereof. A wireless interface of wireless devices 302, 304 can include one or more transceivers for transmitting and receiving data over system 300. Each transceiver can be associated with the same or different frequency bands, the same or different radio access technologies, the same or different network providers (or network operators), and/or the same or different services. For example, wireless devices 302, 304 can include a transceiver that is associated with one or more of the following: CDMA, GSM, WiMAX, 3GPP LTE, and/or HSPA, IEEE 802.11, WiFi, Bluetooth, Zigbee, IrDA, MBMS, etc.

Wireless devices 302, 304 can transmit and/or receive information over system 300 using various communication services. These services can include various voice, data, and/or MBMS services and applications. For example, mobile voice services, mobile data services, push-to-talk services, internet services, web browsing, email, pictures, picture messaging, video, video messaging, broadcast video, audio, voicemail, music MP3's, ring tones, stock tickers, news alerts, etc.

Wireless devices 302, 304 can be connected with access nodes 306, 308 through communication links 316, 318, 320. Links 316, 318, 320 can use various communication media, such as air, space, metal, optical fiber, or some other signal propagation path—including combinations thereof. Links 316, 318, 320 may comprise many different signals sharing the same link. Links 316, 318, 320 could include multiple signals operating in a single "airpath" comprising beacon signals, user communications, communication sessions, overhead communications, frequencies, timeslots, transportation ports, logical transportation links, network sockets, packets, or communication directions. For example, user communication between wireless devices 302, 304 and access nodes 306, 308 could share the same representative wireless link, but be transferred over different communication sessions, frequencies, timeslots, packets, ports, sockets, logical transport links, or in different directions—including combinations thereof.

Access nodes 306, 308 can be any network node configured to provide communication between wireless devices 302, 304 and wireless network 314. Access nodes 306, 308 can be short range access nodes or standard access nodes. A short range access node could include a microcell base station, a picocell base station, a femtocell base station, relay node, or the like. A standard access node could include base transceiver stations, radio base stations, radio network controllers, an eNodeB device, or an enhanced eNodeB device, a donor eNodeB, or the like. Access nodes 306, 308 can use data scheduler(s) and/or coordinate with a scheduler node (not shown) to communicate scheduling decisions (e.g., UL/DL scheduling assignments) to wireless devices 302, 304 using control information carried by an UL/DL control channel.

Access nodes 306, 308 can comprise a processor and associated circuitry to execute or direct the execution of computer-readable instructions to obtain information. Access nodes 306, 308 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Access nodes 306, 308 can receive instructions and other input at a user interface.

Gateway node 310 can be any network node configured to interface with other network nodes using various protocols. Gateway node 310 can communicate user data over system 300. Gateway node 310 can be a standalone computing device, computing system, or network component, and can be accessible, for example, by a wired or wireless connection, or through an indirect connection such as through a computer network or communication network. For example, gateway node 310 can include a Serving Gateway (SGW) and/or a Packet Data Network Gateway (PGW), etc. One of ordinary skill in the art would recognize that gateway node 310 is not limited to any specific technology architecture, such as LTE, and can be used with any network architecture and/or protocol. Moreover, while one gateway node 310 is illustrated in FIG. 3 as being in communication with wireless network 314, one of ordinary skill in the art would recognize that multiple gateway nodes could be in communication with wireless network 314.

Gateway node 310 can comprise a processor and associated circuitry to execute or direct the execution of computer-readable instructions to obtain information. Gateway node 310 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Gateway node 310 can receive instructions and other input at a user interface.

Controller node 312 can be any network node configured to communicate information and/or control information over system 300. Controller node 312 can be configured to transmit control information associated with a handover procedure. Controller node 312 can be a standalone computing device, computing system, or network component, and can be accessible, for example, by a wired or wireless connection, or through an indirect connection such as through a computer network or communication network. For example, controller node 312 can include a MME, a HSS, a PCRF, an AAA node, a RMS, a SPS, a policy server, etc. One of ordinary skill in the art would recognize that controller node 312 is not limited to any specific technology architecture, such as LTE and can be used with any network architecture and/or protocol. Moreover, while one controller node is illustrated in FIG. 3 as being in communication with wireless network 314, one of ordinary skill in the art would recognize that multiple controller nodes could be in communication with wireless network 314.

Controller node 312 can comprise a processor and associated circuitry to execute or direct the execution of computer-readable instructions to obtain information. Controller node 312 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Controller node 312 can receive instructions and other input at a user interface.

Access node 306 can be in communication with gateway node 310 through communication link 328 and with controller node 312 through communication link 324. Access node 306 can be in communication with access node 308 through communication link 322. Access node 308 can be in communication with gateway node 310 through communication link 326 and with controller node 312 through communication link 330. Gateway node 310 can be in communication with controller node 312 through communication link 332 and with wireless network 314 through communication link 334. The communication links can be wired or wireless links and use various communication protocols such as Internet, IP, LAN, optical networking, HFC, telephony, T1, or some other communication format—including combinations, improvements, or variations thereof. The links can be a radio frequency, microwave, infrared, or other similar signal, and can use a suitable communication protocol, for example, GSM, CDMA, WiMAX, or LTE, or combinations thereof. Other wireless protocols can also be used. The links can be a direct link or might include various equipment, intermediate components, systems, and networks.

Wireless network 314 can be a wired and/or wireless communication network, and can comprise processing nodes, routers, gateways, and physical and/or wireless data links for carrying data among various network elements, including combinations thereof, and can include a LAN or WAN, and an internetwork (including the internet). Wireless network 314 can be capable of carrying data, for example, to support voice, PTT, broadcast video, and data communications by a wireless device such as wireless devices 302, 304. Wireless network protocols can comprise MBMS, CDMA 1×RTT, GSM, UMTS, HSPA, EV-DO, EV-DO rev. A, 3GPP LTE, and WiMAX. Wired network protocols that may be utilized by wireless network 314 comprise Ethernet, Fast Ethernet, Gigabit Ethernet, Local Talk (such as Carrier Sense Multiple Access with Collision Avoidance), Token Ring, FDDI, ATM. Wireless network 314 can also comprise additional base stations, controller nodes, telephony switches, internet routers, network gateways, computer systems, communication links, or some other type of communication equipment, and combinations thereof.

Wireless network 314 may develop a procedure and/or protocol for setting various signal metrics (or thresholds) for handoff of wireless devices 302, 304 from one access node 306 to another 308. For example, access node 306 can inhibit (or delay) handoff of co-deployed high power and/or low power wireless devices 302, 304 when signal indicators reported by the wireless devices 302, 304 do not meet the set signal metrics; the signal metrics are set based on a maximum allowable transmit power (e.g., power class) of wireless devices 302, 304. In some instances, when, for example, the access node 306, 308 monitors a single signal indicator (e.g., a DL RSRQ value) and the monitored signal indicator meets a single signal metric (e.g., a DL RSRQ threshold value), the access node 306, 308 may perform handoff of the wireless device 302, 304 to a neighboring access node 306, 308 before necessary from a range extension perspective. In an exemplary embodiment, access node 306, 308 collects multiple signal indicators that include indicators of signal strength (e.g., RSRP, RSSI, SNR, CNR, SINAD, SII, SINR, SQNR, etc.) and indicators of signal quality (e.g., RSRQ, CQI, QoS requirements, call type, or other policy-related aspects, etc.) associated with access node 306, 308. Wireless network 314 and/or access node 306, 308 can implement periodic and/or event-triggered monitoring of the signal indicators. When multiple signal indicators (e.g., more than one) concurrently meet multiple signal metrics (or thresholds) preset at wireless network 314 and/or access node 306, 308, access node 306, 308 can initiate a handoff of the wireless device 302, 304.

Figure 4:
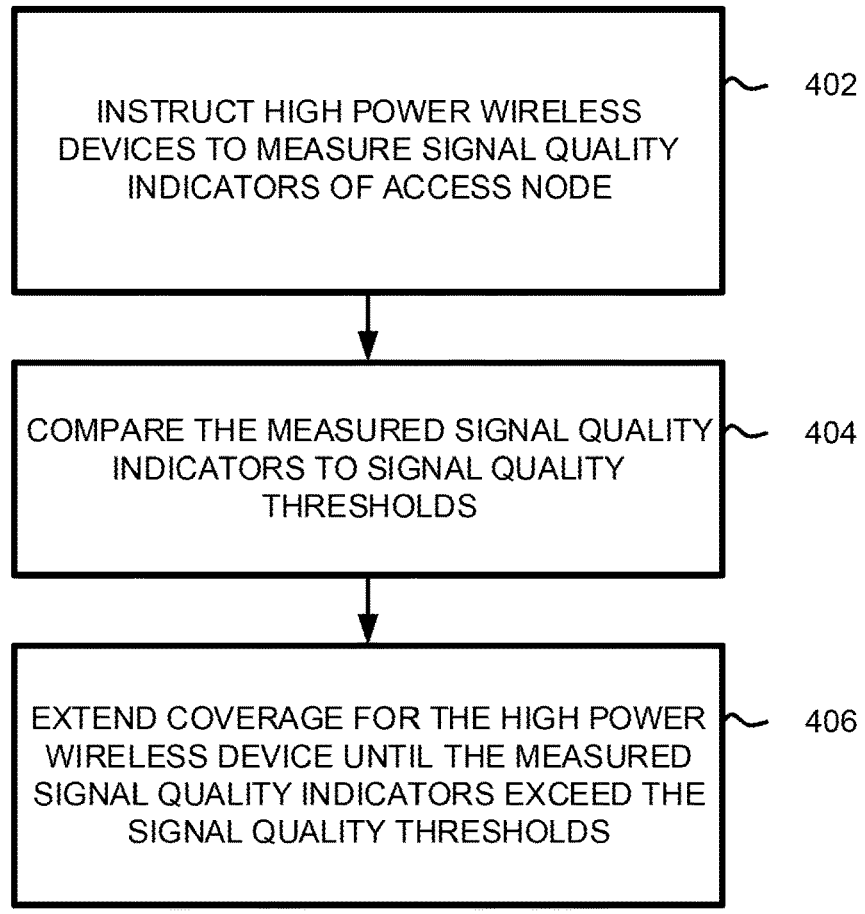
FIG. 4 illustrates an exemplary method for extending coverage of wireless devices operating in a wireless network.

FIG. 4 illustrates another exemplary method for extending coverage of wireless devices operating in a wireless communication network. The method of FIG. 4 will be discussed with reference to the exemplary system 300 illustrated in FIG. 3 and the exemplary power class range(s) of co-deployed high power and low power wireless devices illustrated in FIG. 1B. But, the exemplary method for extending coverage of wireless devices illustrated in FIG. 4 can be implemented with any suitable communication system. In addition, although FIG. 4 depicts steps performed in a particular order or arrangement. One skilled in the art, using the disclosure provided herein, will appreciate that various steps of the method can be omitted, rearranged, combined, and/or adapted in various ways.

Referring to FIG. 4, at 402, the wireless network and/or access nodes can instruct high power wireless devices to measure signal indicators. For example, wireless device 302A can use periodic and/or event-triggered PHR and/or ePHR messaging to report a current transmit power state or power headroom at access node 306. Based on the current transmit power state or power headroom reported at access node 306, access node 306 can classify (or group) wireless device 302A as a high power or low power wireless device. Wireless network 314 and/or access node 306 can configure additional reporting procedures (e.g., other than or in addition to the PHR and/or ePHR reporting) to collect signal indicators from wireless devices 302, 304 classified as high power 302A and/or low power wireless devices; the signal indicators can be used to inhibit (or delay) handoff of high power and/or low power wireless devices.

In one embodiment, access node 306 collects multiple signal indicators that include indicators of signal strength (e.g., RSRP, RSSI, SNR, CNR, SINAD, SII, SINR, SQNR, etc.) and indicators of signal quality (e.g., RSRQ, CQI, QoS requirements, call type, or other policy-related aspects) associated with access node 306 and reported by high power wireless device 302A. Wireless network 314 and/or access node 306 implements periodic and/or event-triggered monitoring (or measurement) of the signal indicators.

At 404, the wireless network and/or access nodes compare the monitored (or measured) signal indicators to signal metrics (or thresholds). For example, access node 306 can compare the multiple, collected signal indicators such as the collected RSRP and RSRQ signal indicators to multiple preset signal metrics (or thresholds). The preset signal metrics can be set based on a reported power class of the wireless device. The preset signal metrics can also correspond to collected signal indicators. For example, the preset signal metrics (or thresholds) can include RSRP and RSRQ metrics (or thresholds); the RSRP and RSRQ metrics can be preset based on the power class (e.g., illustrated in Table 1) of the wireless device 302A. Thus, in an exemplary embodiment, access node 306 compares the monitored (or measured) RSRP and RSRQ signal indicators to preset RSRP and RSRQ metrics (or thresholds), respectively. When both the RSRP and RSRQ signal indicators concurrently meet the preset RSRP and RSRQ metrics preset at wireless network 314 and/or access node 306, access node 306 can initiate a handoff of wireless device 302A to access node 308.

At 406, the wireless network and/or access nodes extend coverage for co-deployed wireless devices until the monitored (or measured) signal indicators meet the signal metrics (or thresholds). For example, access node 306 can collect signal indicators (e.g., RSRP, RSSI, SNR, CNR, SINAD, SII, SINR, SQNR, RSRQ, CQI, QoS requirements, call type, or other policy-related aspects, etc.) reported by high power 302A and/or low power wireless devices at access node 306. The access node 306 can inhibit (or delay) handoff of the co-deployed wireless devices when the signal indicators do not meet various signal metrics (or thresholds). For example, as high power wireless device 302A moves throughout the coverage area 336 of access node 306, high power wireless device 302A may report current RSRP and RSRQ signal indicators. The access node 306 can monitor the reported RSRP and RSRQ signal indicators continuously compare the reported RSRP and RSRQ signal indicators to, for example, preset RSRP and RSRQ metrics. Access node 306 can inhibit (or delay) handoff of high power wireless device 302A (e.g., initially located in a class 3 and/or class 4 power range) when the RSRP and RSRQ signal indicators do not concurrently meet both the preset RSRP and RSRQ metrics (e.g., access node 306 can inhibit handoff of high power wireless device 302A until 302A is located in a class 1 and/or class 2 power range, illustrated as wireless device 302B).

Figure 5:
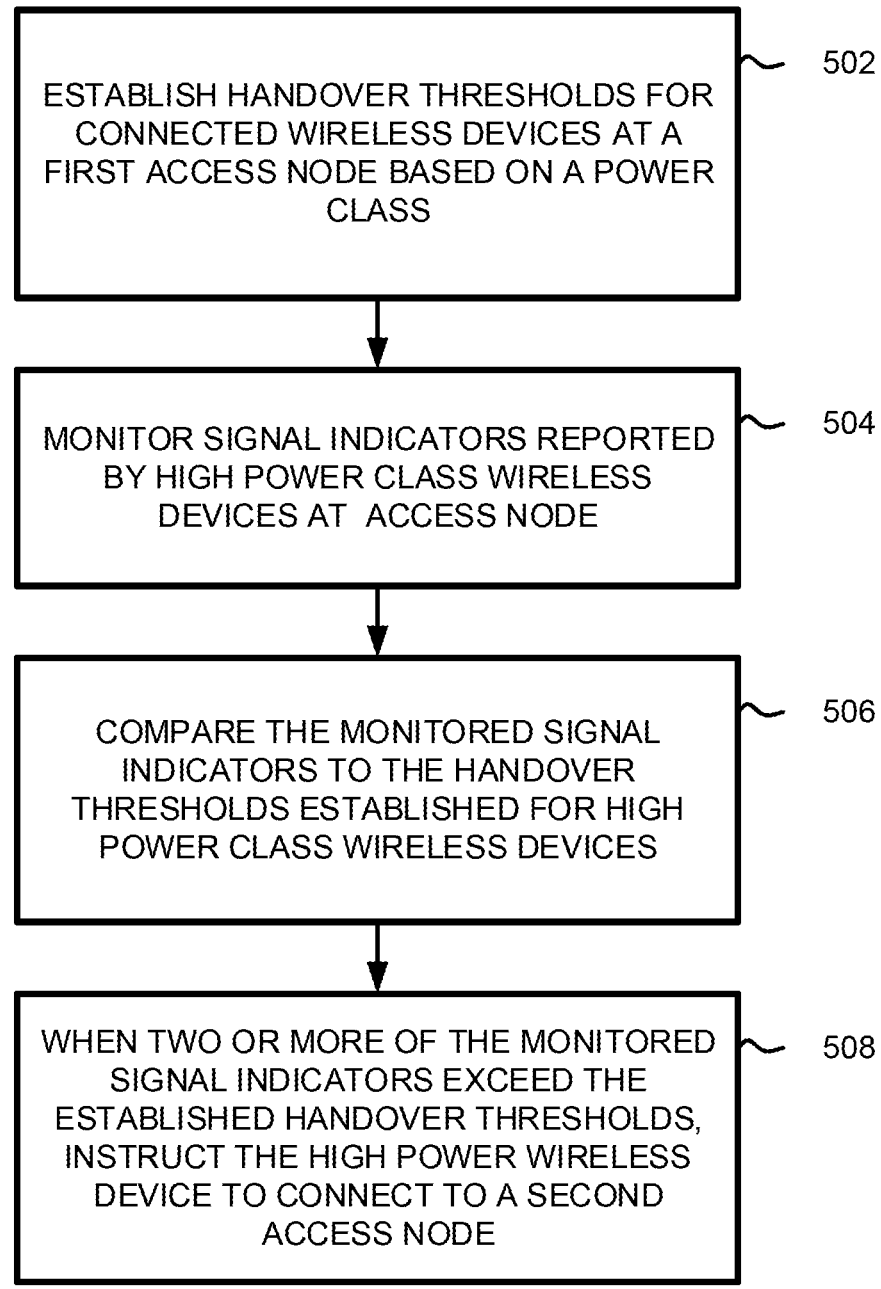
FIG. 5 illustrates an exemplary method for triggering handoff of wireless devices operating in a wireless network.

FIG. 5 illustrates another exemplary method for triggering handoff of wireless devices operating in a wireless communication network. The method of FIG. 5 will be discussed with reference to the exemplary system 300 illustrated in FIG. 3 and the exemplary power class range(s) of co-deployed high power and low power wireless devices illustrated in FIG. 1B. But, the exemplary method for extending coverage of wireless devices illustrated in FIG. 5 can be implemented with any suitable communication system. In addition, although FIG. 5 depicts steps performed in a particular order or arrangement. One skilled in the art, using the disclosure provided herein, will appreciate that various steps of the method can be omitted, rearranged, combined, and/or adapted in various ways.

At 502, the wireless network and/or access nodes can establish handover thresholds for wireless devices based on a power class of the wireless device. For example, wireless network 314 and/or access nodes 306, 308 can instruct co-deployed wireless devices 302A, 304 to use periodic and/or event-triggered PHR and/or ePHR messaging to report a current transmit power state or power headroom at access nodes 306, 308. Using the PHR and/or ePHR messages sent from wireless devices 302A, 304, access node 306, 308 can classify (or group) the wireless devices 302A, 304 as high power 302A and/or low power wireless devices 304. Access node 306, 308 presets signal metrics (or thresholds) for the classified (or grouped) wireless devices. For example, access node 306, 308 may create a first set of signal metrics (or thresholds) for wireless devices classified (or grouped) as high power wireless devices 302A based on the power class of the wireless device (e.g., power class 1 and/or 2, illustrated in Table 1). Access node 306, 308 may create a second set of signal metrics (or thresholds) for wireless devices classified (or grouped) as low power wireless devices 304 based on the power class of the wireless device (e.g., power class 3 and/or 4, illustrated in Table 1).

At 504, the wireless network and/or access nodes monitor signal indicators reported by the high power wireless devices. For example, wireless network 314 and/or access nodes 306, 308 can configure reporting procedures (e.g., other than or in addition to the PHR and/or ePHR reporting discussed at step 502) to collect signal indicators from co-deployed wireless devices classified (or grouped) as high power wireless devices 302A; the signal indicators (e.g., two or more of RSRP, RSSI, SNR, CNR, SINAD, SII, SINR, SQNR, RSRQ, CQI, QoS requirements, call type, or other policy-related aspects, etc.) can be used to inhibit (or delay) handoff of high power wireless device 302A. The access nodes 306, 308 can implement periodic and/or event-triggered monitoring of the collected signal indicators.

At 506, the wireless network and/or access nodes can compare the monitored signal indicators to the first set of signal metrics (or thresholds) established (or created) for high power wireless devices. For example, access node 306, 308 can compare RSRP and RSRQ signal indicators collected from high power wireless device 302A to a first set of RSRP and RSRQ signal metrics (or thresholds) established for high power wireless devices 302A.

At 508, the wireless network and/or access nodes can instruct the high power wireless device to connect to a second access node. For example, when the RSRP and RSRQ signal indicators reported by high power wireless device 302A concurrently meet the first set of RSRP and RSRQ signal metrics (or thresholds), respectively, access node 306 can perform handoff of the high power wireless device 302A from access node 306 to neighboring access node 308.

One skilled in the art, using the disclosure provided herein, will appreciate that various steps of the methods can be omitted, rearranged, combined and/or adapted in various ways and can be completed by multiple wireless devices and access nodes.

Figure 6:
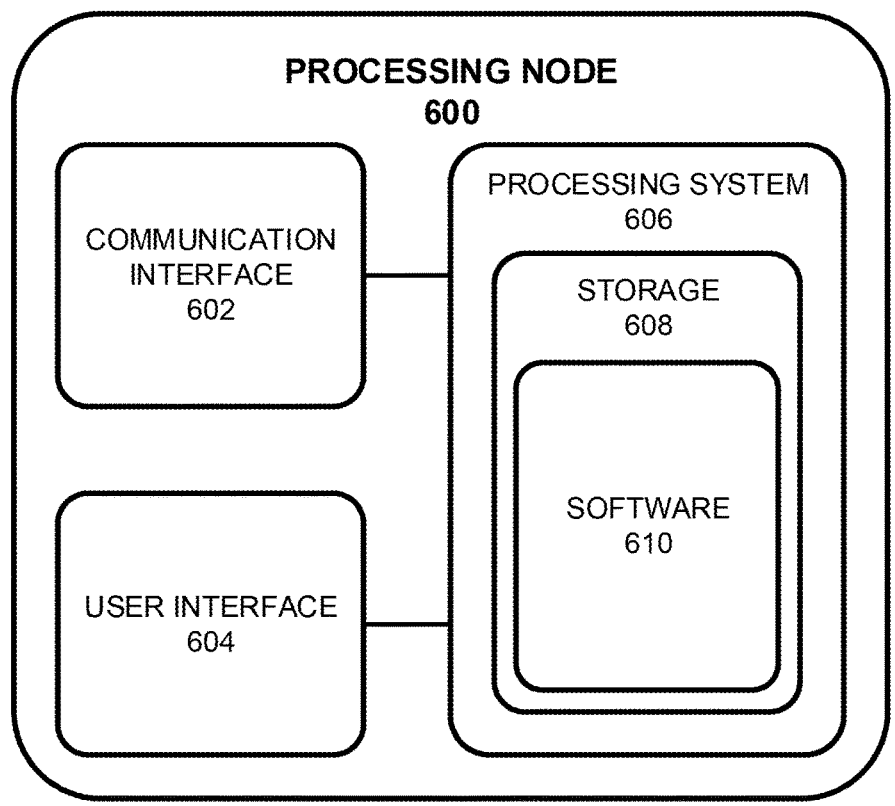
FIG. 6 illustrates an exemplary processing node.

FIG. 6 illustrates an exemplary processing node 600 in a communication system. Processing node 600 comprises communication interface 602, user interface 604, and processing system 606 in communication with communication interface 602 and user interface 604. Processing node 600 can be configured to determine a communication access node for a wireless device. Processing system 606 includes storage 608, which can comprise a disk drive, flash drive, memory circuitry, or other memory device. Storage 608 can store software 610 which is used in the operation of the processing node 600. Storage 608 may include a disk drive, flash drive, data storage circuitry, or some other memory apparatus. Software 610 may include computer programs, firmware, or some other form of machine-readable instructions, including an operating system, utilities, drivers, network interfaces, applications, or some other type of software. Processing system 606 may include a microprocessor and other circuitry to retrieve and execute software 610 from storage 608. Processing node 600 may further include other components such as a power management unit, a control interface unit, etc., which are omitted for clarity. Communication interface 602 permits processing node 600 to communicate with other network elements. User interface 604 permits the configuration and control of the operation of processing node 600.

Examples of processing node 600 include access nodes 106, 106A, 106B, network node 110, gateway node 310, and controller node 312. Processing node 600 can also be an adjunct or component of a network element, such as an element of access nodes 106, 106A, 106B, network node 110, gateway node 310, and controller node 312. Processing node 600 can also be another network element in a communication system. Further, the functionality of processing node 600 can be distributed over two or more network elements of a communication system.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths. The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention, and that various modifications may be made to the configuration and methodology of the exemplary embodiments disclosed herein without departing from the scope of the present teachings. Those skilled in the art also will appreciate that various features disclosed with respect to one exemplary embodiment herein may be used in combination with other exemplary embodiments with appropriate modifications, even if such combinations are not explicitly disclosed herein. As a result, the invention is not limited to the specific embodiments described above, but only by the following claims and their equivalents.

What is claimed is:

1. A method for handoff of a wireless device, the method comprising:

receiving, at a first access node, power reports from multiple wireless devices operating in a coverage area of the first access node, each power report including a current transmit power state of a respective wireless device that is determined based on a maximum allowable transmit power and a number of wireless resources allocated to the respective wireless device;

grouping, at the first access node, the multiple wireless devices into a first and second power classes based on current transmit power states included the received power reports, the first power class having a higher maximum allowable transmit power relative to the second power class;

instructing, by the first access node, the wireless devices of the first power class to report first and second signal indicators, the first signal indicator relating to a signal quality and the second signal indicator relating to a signal strength;

comparing, at the first access node, the reported first signal indicator to a first signal metric;

comparing, at the first access node, the reported second signal indicator to a second signal metric; and when the first and second signal indicators concurrently meet the first and second signal metrics, respectively, performing a handoff of the wireless devices of the first power class to a second access node.

2. The method of claim 1, wherein the wireless devices of the first class are high power wireless devices, and the wireless devices of the second class are low power wireless devices.

3. The method of claim 1, wherein the first signal indicator is a Reference Signal Receive Quality (RSRQ) indicator and the second signal indicator is a Reference Signal Received Power (RSRP).

4. The method of claim 3, wherein the first signal metric is a preset RSRQ value and the second signal metric is a preset RSRP value.

5. The method of claim 4, wherein the first and second signal metrics are preset based on the first power class of the wireless devices.

6. The method of claim 1, wherein the power reports are power headroom (PHR) and/or enhanced PHR (ePHR) reports.

7. The method of claim 1, wherein the current transmit power state of a respective wireless device is further determined based on a target received power, a pathloss compensation factor, and a pathloss.

* * * * *